United States Patent
Landis et al.

(10) Patent No.: US 12,388,595 B2
(45) Date of Patent: Aug. 12, 2025

(54) PILOT SYMBOLS HAVING PILOT SIGNALING AND PEAK-TO-AVERAGE-POWER-RATIO SIGNALING

(71) Applicant: QUALCOMM Incorporated, San Diego, CA (US)

(72) Inventors: Shay Landis, Hod Hasharon (IL); Assaf Touboul, Netanya (IL); Idan Michael Horn, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/929,846

(22) Filed: Sep. 6, 2022

(65) Prior Publication Data
US 2024/0080159 A1  Mar. 7, 2024

(51) Int. Cl.
*H04L 5/00* (2006.01)
*H04L 27/26* (2006.01)

(52) U.S. Cl.
CPC .......... *H04L 5/0051* (2013.01); *H04L 27/262* (2013.01); *H04L 27/2636* (2013.01)

(58) Field of Classification Search
CPC ......... H04L 27/26526; H04L 27/26134; H04L 27/2627; H04L 5/00; H04L 25/02; H04L 1/00; H04L 27/2614; H04L 25/0224; H04L 5/0091; H04L 27/262; H04L 27/2636; H04L 27/2035; H04L 27/2613; H04L 5/0051; H04L 5/10; H04W 72/23
See application file for complete search history.

(56) References Cited

U.S. PATENT DOCUMENTS

| | | | |
|---|---|---|---|
| 10,412,745 B2 * | 9/2019 | Fodor | H04L 27/261 |
| 11,190,329 B2 * | 11/2021 | Sengupta | H04W 72/23 |
| 11,722,346 B2 * | 8/2023 | Cha | H04L 5/0053 |
| | | | 370/329 |
| 11,838,234 B2 * | 12/2023 | Cha | H04L 5/0048 |
| 11,949,541 B2 * | 4/2024 | Kuchi | H04L 25/03834 |
| 12,021,676 B2 * | 6/2024 | Noh | H04L 27/186 |
| 12,074,817 B2 * | 8/2024 | Cha | H04L 27/2613 |
| 12,075,417 B2 * | 8/2024 | Kim | H04L 25/0204 |
| 2012/0140836 A1 * | 6/2012 | Helard | H04L 27/2618 |
| | | | 375/260 |
| 2016/0211960 A1 * | 7/2016 | Wang | H04L 5/0051 |
| 2020/0127801 A1 * | 4/2020 | Sengupta | H04L 27/262 |

(Continued)

OTHER PUBLICATIONS

International Search Report and Written Opinion—PCT/US2023/070493—ISA/EPO—Oct. 24, 2023.

(Continued)

*Primary Examiner* — Jung Liu
(74) *Attorney, Agent, or Firm* — Harrity & Harrity LLP

(57) ABSTRACT

Various aspects of the present disclosure generally relate to wireless communication. In some aspects, a receiving device may receive a communication that includes at least one pilot symbol, the at least one pilot symbol including pilot signaling on a first set of one or more subcarriers and peak-to-average-power-ratio (PAPR) signaling on a second set of one or more subcarriers. The receiving device may communicate based at least in part on the pilot signaling. Numerous other aspects are described.

30 Claims, 10 Drawing Sheets

(56) References Cited

U.S. PATENT DOCUMENTS

| | | | |
|---|---|---|---|
| 2021/0051641 A1* | 2/2021 | Si | H04J 11/0069 |
| 2022/0294585 A1* | 9/2022 | Noh | H04L 5/0048 |
| 2023/0047906 A1* | 2/2023 | Cha | H04L 27/262 |
| 2023/0216718 A1* | 7/2023 | Kuchi | H04L 5/0048 370/329 |
| 2024/0014922 A1* | 1/2024 | Liu | H04L 1/0009 |
| 2024/0073077 A1* | 2/2024 | Park | H04L 27/26526 |
| 2024/0275555 A1* | 8/2024 | Nakamura | H04W 72/20 |
| 2024/0297815 A1* | 9/2024 | Bhamri | H04L 27/2633 |
| 2024/0348481 A1* | 10/2024 | Noh | H04L 27/186 |
| 2024/0356792 A1* | 10/2024 | Kuchi | H04L 27/26412 |
| 2025/0056286 A1* | 2/2025 | Astely | H04L 5/0007 |

OTHER PUBLICATIONS

Namitha A.S., et al., "A combined technique for carrier frequency offset estimation and peak-to-average power ratio reduction in OFDM systems using null subcarriers and Cuckoo search algorithm", Telecommunication Systems, Baltzer Science Publishers, Basel, CH, vol. 63, No. 2, Nov. 24, 2015, 11 Pages, XP036039801, abstract sections 3, 5.

\* cited by examiner

12,388,595 B2

PILOT SYMBOLS HAVING PILOT SIGNALING AND PEAK-TO-AVERAGE-POWER-RATIO SIGNALING

FIELD OF THE DISCLOSURE

Aspects of the present disclosure generally relate to wireless communication and to techniques and apparatuses for pilot symbols having pilot signaling and peak-to-average-power-ratio signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
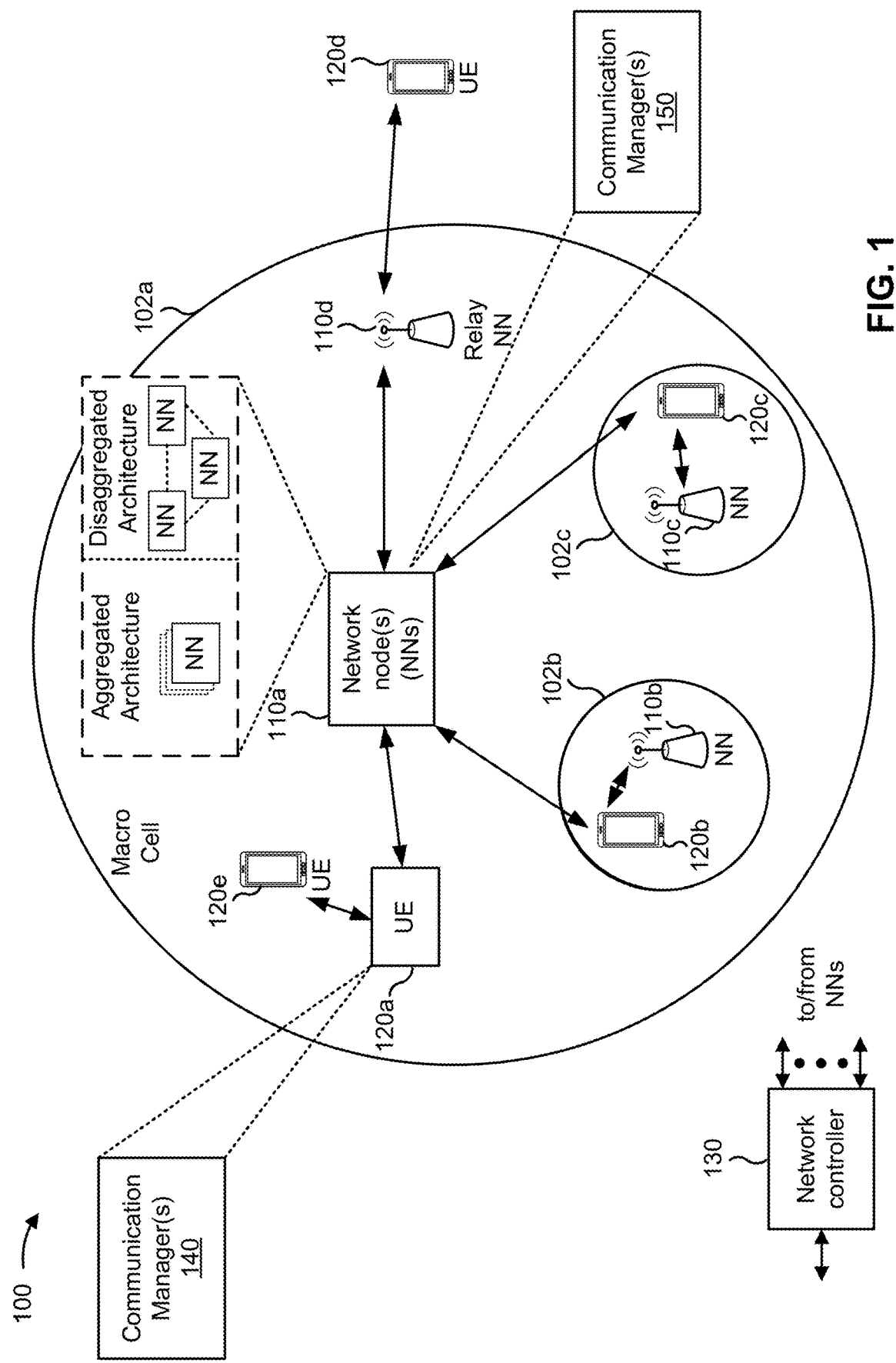
FIG. 1 is a diagram illustrating an example of a wireless network, in accordance with the present disclosure.

Some aspects described herein relate to a method of wireless communication performed by a receiving device. The method may include receiving a communication that includes at least one pilot symbol, the at least one pilot symbol including pilot signaling on a first set of one or more subcarriers and peak-to-average-power-ratio (PAPR) signaling on a second set of one or more subcarrier. The method may include communicating based at least in part on the pilot signaling.

Some aspects described herein relate to a method of wireless communication performed by a transmitting device. The method may include transmitting a communication that includes at least one pilot symbol, the at least one pilot symbol including pilot signaling on a first set of one or more subcarriers and PAPR signaling on a second set of one or more subcarrier. The method may include communicating based at least in part on the pilot signaling.

Some aspects described herein relate to a receiving device for wireless communication. The receiving device may include a memory and one or more processors coupled to the memory. The one or more processors may be configured to receive a communication that includes at least one pilot symbol, the at least one pilot symbol including pilot signaling on a first set of one or more subcarriers and PAPR signaling on a second set of one or more subcarrier. The one or more processors may be configured to communicate based at least in part on the pilot signaling.

Some aspects described herein relate to a transmitting device for wireless communication. The transmitting device may include a memory and one or more processors coupled to the memory. The one or more processors may be configured to transmit a communication that includes at least one pilot symbol, the at least one pilot symbol including pilot signaling on a first set of one or more subcarriers and PAPR signaling on a second set of one or more subcarrier. The one or more processors may be configured to communicate based at least in part on the pilot signaling.

Some aspects described herein relate to a non-transitory computer-readable medium that stores a set of instructions for wireless communication by a receiving device. The set of instructions, when executed by one or more processors of the receiving device, may cause the receiving device to receive a communication that includes at least one pilot symbol, the at least one pilot symbol including pilot signaling on a first set of one or more subcarriers and PAPR signaling on a second set of one or more subcarrier. The set of instructions, when executed by one or more processors of the receiving device, may cause the receiving device to communicate based at least in part on the pilot signaling.

Some aspects described herein relate to a non-transitory computer-readable medium that stores a set of instructions for wireless communication by a transmitting device. The set of instructions, when executed by one or more processors of the transmitting device, may cause the transmitting device to transmit a communication that includes at least one pilot symbol, the at least one pilot symbol including pilot signaling on a first set of one or more subcarriers and PAPR signaling on a second set of one or more subcarrier. The set of instructions, when executed by one or more processors of the transmitting device, may cause the transmitting device to communicate based at least in part on the pilot signaling.

Some aspects described herein relate to an apparatus for wireless communication. The apparatus may include means for receiving a communication that includes at least one pilot symbol, the at least one pilot symbol including pilot signaling on a first set of one or more subcarriers and PAPR signaling on a second set of one or more subcarrier. The apparatus may include means for communicating based at least in part on the pilot signaling.

Some aspects described herein relate to an apparatus for wireless communication. The apparatus may include means for transmitting a communication that includes at least one pilot symbol, the at least one pilot symbol including pilot signaling on a first set of one or more subcarriers and PAPR signaling on a second set of one or more subcarrier. The apparatus may include means for communicating based at least in part on the pilot signaling.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a receiving device (e.g., a UE 120 or a network node 110) may include a communication manager 140 or 150. As described in more detail elsewhere herein, the communication manager 140 or 150 may receive a communication that includes at least one pilot symbol, the at least one pilot symbol including pilot signaling on a first set of one or more subcarriers and peak-to-average-power-ratio (PAPR) signaling on a second set of one or more subcarriers; and communicate based at least in part on the pilot signaling.

Additionally, or alternatively, the communication manager 140 or 150 may perform one or more other operations described herein.

In some aspects, a transmitting device (e.g., a network node 110 or a 120) may include a communication manager 150 or 140. As described in more detail elsewhere herein, the communication manager 150 or 140 may transmit a communication that includes at least one pilot symbol, the at least one pilot symbol including pilot signaling on a first set of one or more subcarriers and PAPR signaling on a second set of one or more subcarriers; and communicate based at least in part on the pilot signaling. Additionally, or alternatively, the communication manager 150 or 140 may perform one or more other operations described herein.

As indicated above, FIG. 1 is provided as an example. Other examples may differ from what is described with regard to FIG. 1.

Figure 2:
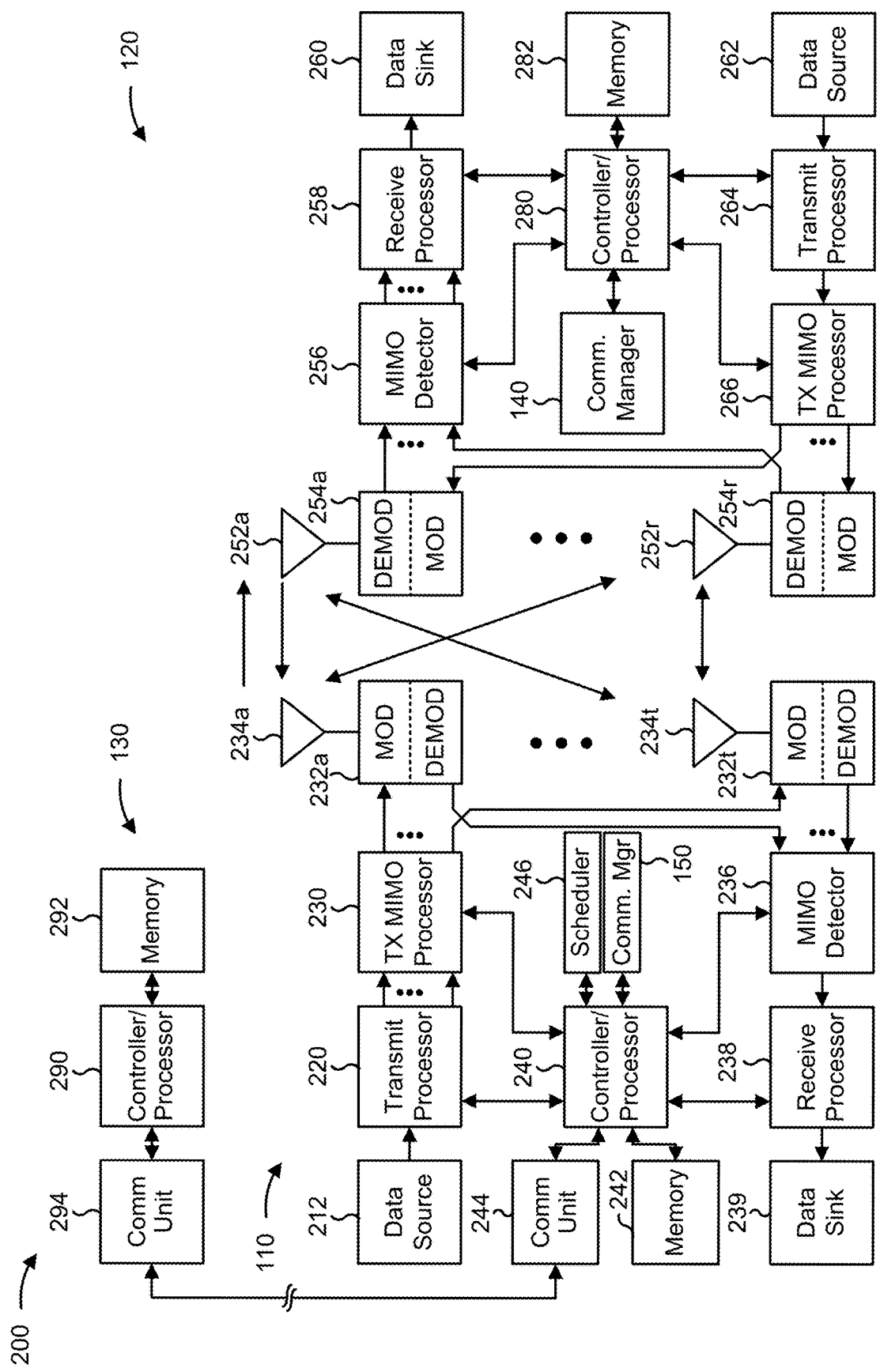
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with pilot symbols having pilot signaling and peak-to-average-power-ratio signaling, as described in more detail elsewhere herein. In some aspects, the transmitting device described herein is the network node 110, is included in the network node 110, or includes one or more components of the network node 110 shown in FIG. 2. In some aspects, the transmitting device described herein is the UE 120, is included in the UE 120, or includes one or more components of the UE 120 shown in FIG. 2. In some aspects, the receiving device described herein is the network node 110, is included in the network node 110, or includes one or more components of the network node 110 shown in FIG. 2. In some aspects, the receiving device described herein is the UE 120, is included in the UE 120, or includes one or more components of the UE 120 shown in FIG. 2.

Figure 7:
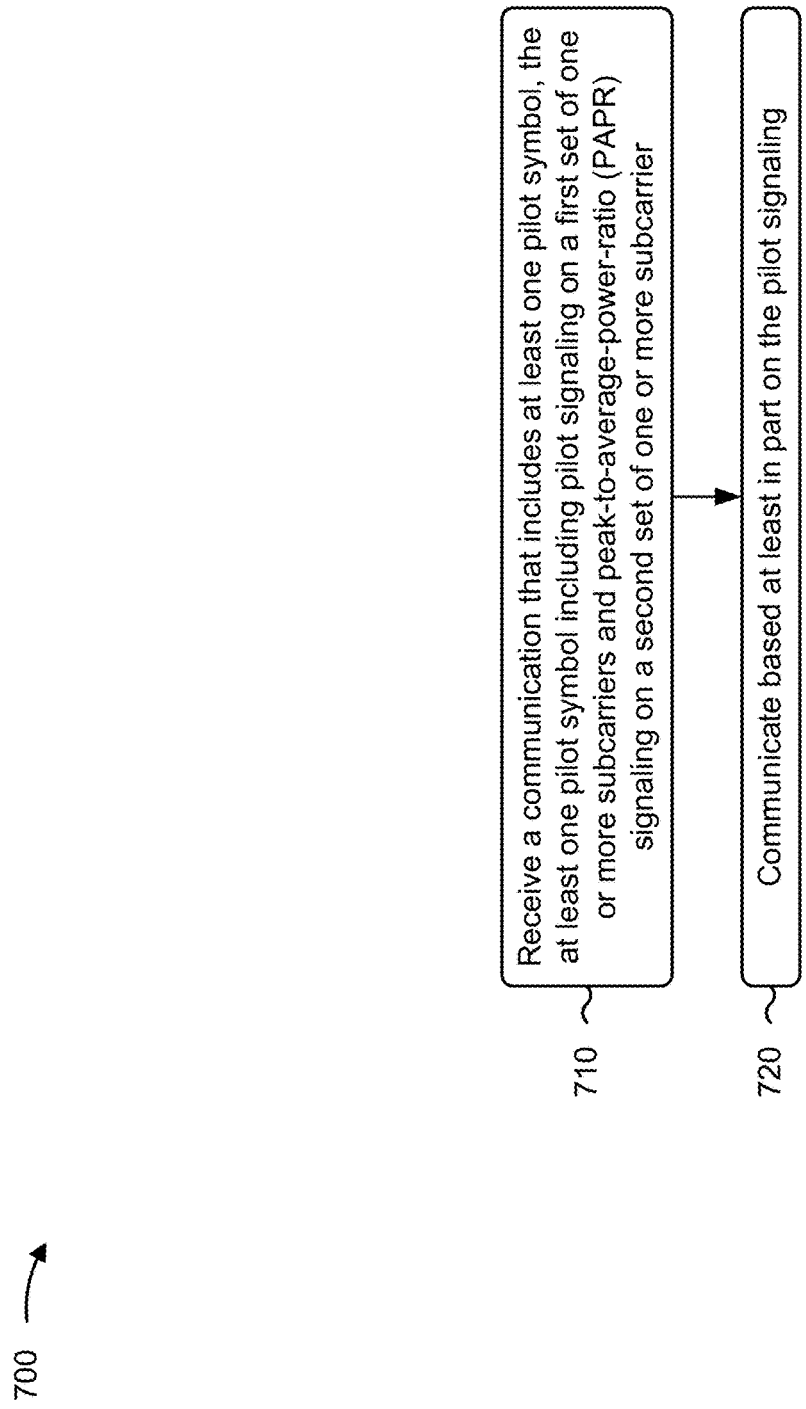
FIG. 7 is a diagram illustrating an example process performed, for example, by a receiving device, in accordance with the present disclosure.
Figure 8:
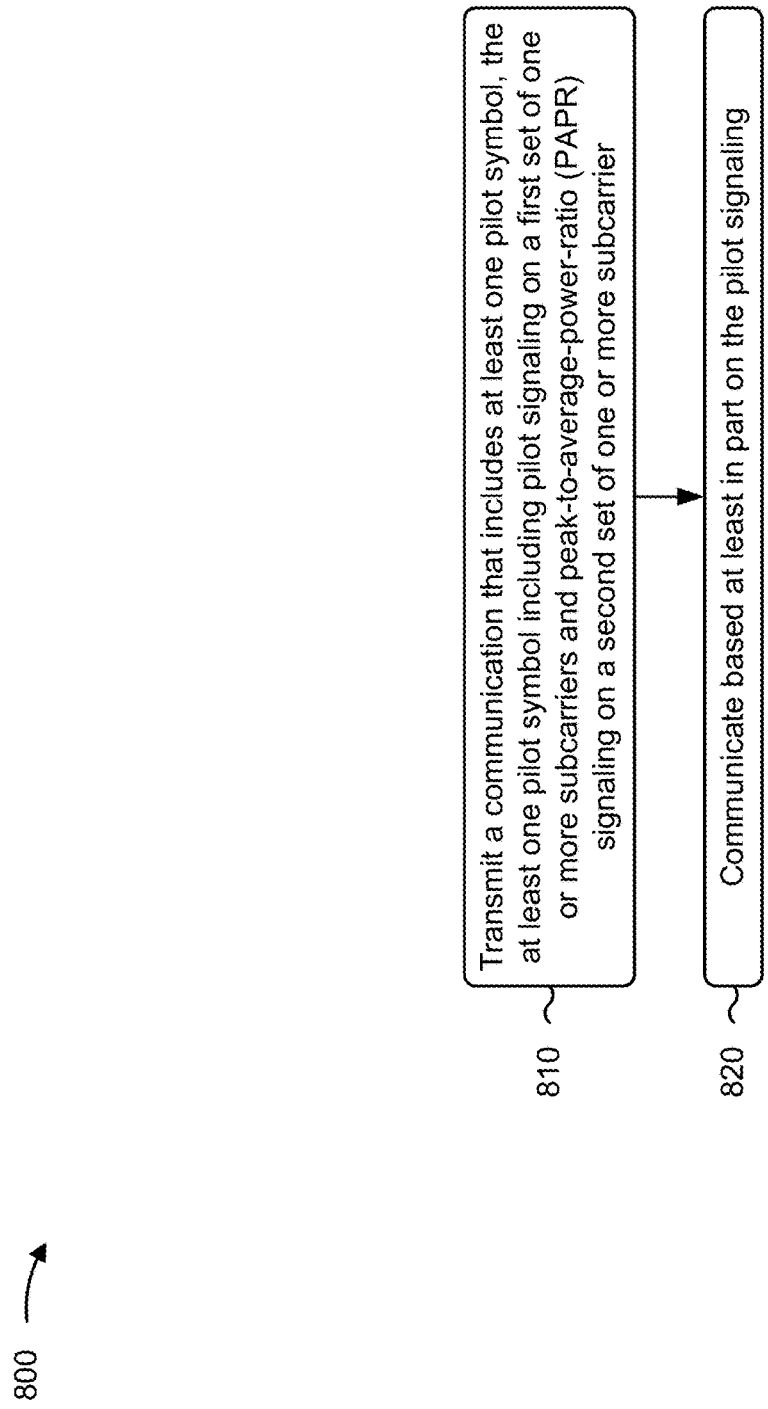
FIG. 8 is a diagram illustrating an example process performed, for example, by a transmitting device, in accordance with the present disclosure.

In some examples, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the receiving device includes means for receiving a communication that includes at least one pilot symbol, the at least one pilot symbol including pilot signaling on a first set of one or more subcarriers and PAPR signaling on a second set of one or more subcarriers; and/or means for communicating based at least in part on the pilot signaling. In some aspects, the means for the receiving device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiving device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitting device includes means for transmitting a communication that includes at least one pilot symbol, the at least one pilot symbol including pilot signaling on a first set of one or more subcarriers and PAPR signaling on a second set of one or more subcarriers; and/or means for communicating based at least in part on the pilot signaling. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitting device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
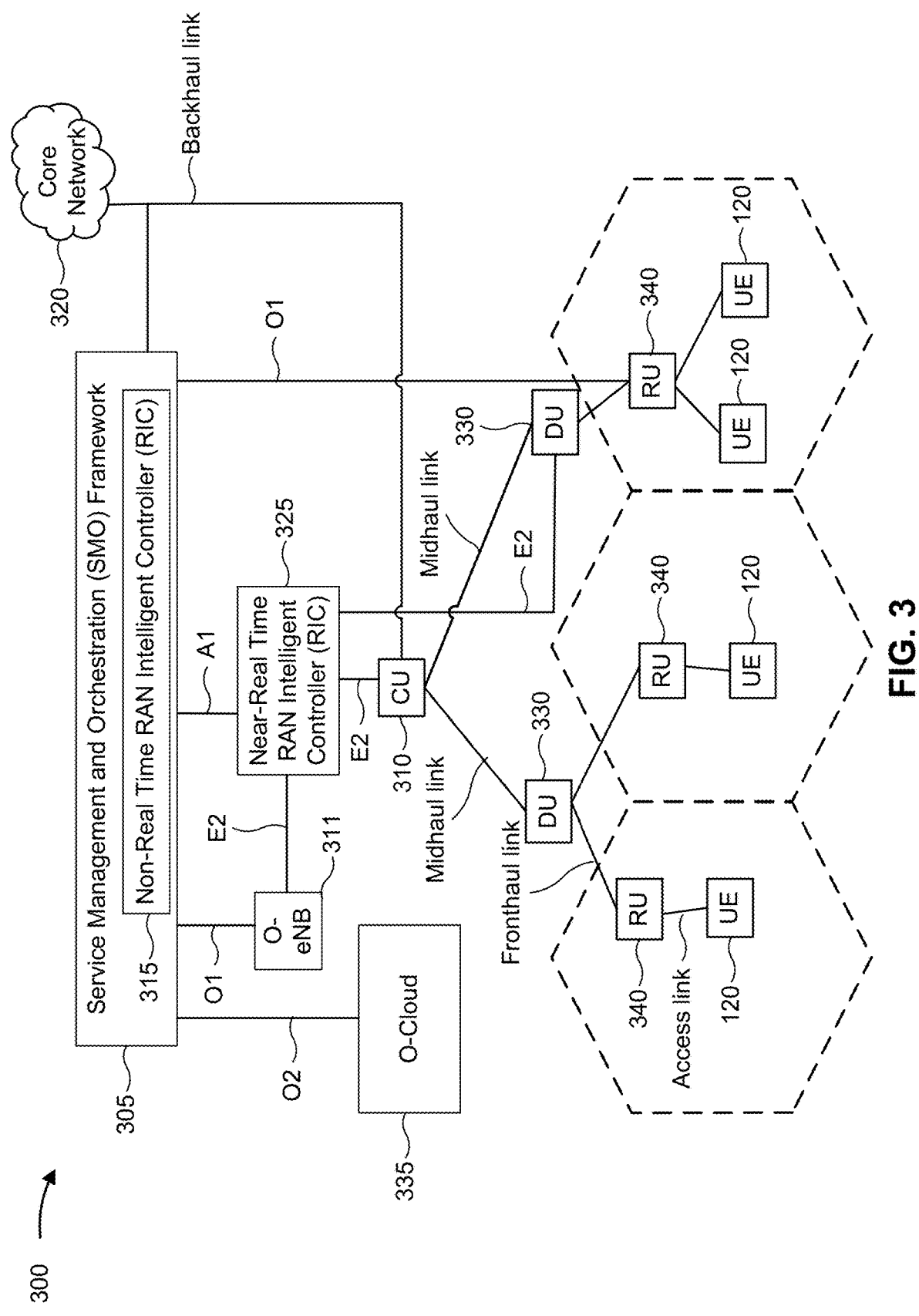
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
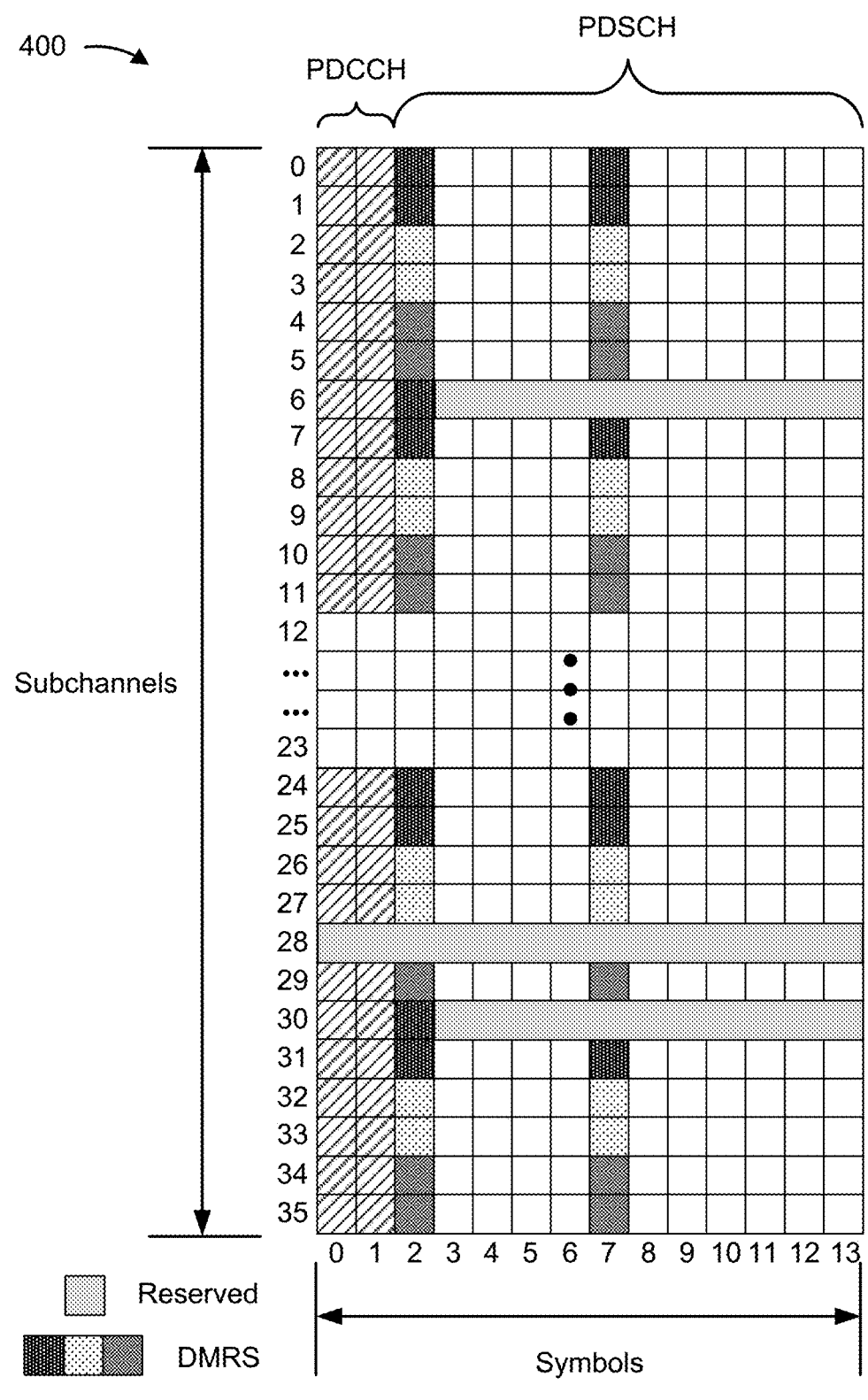
FIG. 4 is a diagram illustrating an example of UE subcarrier tone reservation on one or more subcarriers, in accordance with the present disclosure.

FIG. 4 is a diagram illustrating an example 400 of UE subcarrier tone reservation on one or more subcarriers, in accordance with the present disclosure. In some networks, a network node may transmit a downlink transmission on a physical downlink shared channel (PDSCH) with tone reservation on one or more subcarriers based at least in part on measurement(s) of uplink signals from a UE, a request from the UE, an indication of a capability of the UE, and/or an independent determination by the network node, among other examples (e.g., as described herein).

In some aspects, the UE may be configured to communicate with the network node with a configuration for tone reservation. For example, the configuration may be common for multiple communications (e.g., for a configured grant and/or semi-persistent scheduling resources), multiple UEs connected to the network node, a beam provided by the network node, a cell provided by the network node, and/or the like.

As shown by example 400, a PDSCH may include one or more reserved subcarriers (e.g., tones) on which data and/or pilots are not to be transmitted. In some aspects, the subcarriers may be empty (e.g., not having any information intended for transmission to the UE). Additionally, or alternatively, tone reservation may be applied to physical downlink control channel (PDCCH) symbols (e.g., symbols 0 and 1 in FIG. 4). In some aspects, a pilot may include or may be a reference signal. In some aspects, the network node may transmit a signal that is configured to improve a PAPR for a downlink transmission on the PDSCH by using tone reservation to forego transmission of data and/or pilots on the one or more reserved subcarriers. While example 400 provides an example of tone reservation applied to PDSCH and/or PDCCH, in some aspects (e.g., when a UE applies tone reservation to uplink communications transmitted to a network node), tone reservation may be applied to physical uplink shared channel (PUSCH) and/or physical uplink control channel (PUCCH) symbols.

The use of tone reservation may involve significant overhead that may decrease overall throughput. For example, to enable the UE to identify which subcarriers to discard (e.g., the reserved subcarriers), the network node may indicate the frequency locations (e.g., using identifiers) of the subcarriers to the UE. These indications may consume communication, network, and power resources (e.g., bits) for the network node to transmit (e.g., in downlink control information) and for the UE to receive. Additionally, or alternatively, consumption of the network resources for the indications may decrease throughput available for data (e.g., associated with the PDSCH). In a communication where tone reservation is not used, an increase in PAPR may occur, which may degrade communications between the network node and the UE, and may negatively affect an efficiency of power amplification at the network node. Based at least in part on degradation of the communications, the UE and/or the network node may consume power, communication, network, and computing resources to detect and/or correct communication errors associated with the degradation.

As indicated above, FIG. 4 is provided as an example. Other examples may differ from what is described with respect to FIG. 4.

In some networks, waveforms for wireless communications may be selected for use to compensate for noise within the network. For example, a network may use a time-division multiplexing (TDM) waveform, such as a discrete Fourier transform-spread orthogonal frequency-division multiplexing (DFT-s-OFDM) waveform (e.g., on a downlink), to compensate for and/or to minimize effects of phase noise. The network may use the TDM waveform based at least in part on the wireless communications using frequency bands, such as FR4, FR5, and/or sub-terahertz frequencies.

In some networks, the DFT-s-OFDM waveform may have similar characteristics to a single carrier waveform (e.g., using TDM), which may allow for a reduced PAPR. The reduced PAPR and reduced phase noise associated with the DFT-s-OFDM waveform may improve performance, power efficiency, and/or coverage of the network.

DMRSs in a DFT-s-OFDM use an entire symbol based at least in part on DFT-s-OFDM being a frequency division multiplexed (FDM) waveform (e.g., with a single carrier waveform). However, if a transmitting device transmits via multiple layers, the transmitting device may consume multiple symbols for DMRSs for different layers. For example, a transmission with two layers (e.g., two streams) may require two symbols of DMRSs. This may consume an increasing amount of network resources for each layer transmitted. In this way, TDM communications with DMRSs may have relatively high overhead.

In some networks, the transmitting device may use FDM to transmit multiple DMRSs on a single symbol (e.g., using multiple ports). However, this may remove the PAPR reduction benefit of DFT-s-OFDM and/or an FDM waveform, which may cause an increased PAPR and degraded performance.

In some aspects described herein, a network may configure a pilot symbol with pilot signaling on a first set of subcarriers and with PAPR signaling (e.g., tone reservation signaling configured to reduce the PAPR) on a second set of subcarriers. In some aspects, the pilot signaling may be associated with a first receiving device and the pilot symbol may include additional pilot signaling associated with a second receiving device. For example, the pilot symbol may include a first set of subcarriers with pilot signaling (e.g., DMRSs) for a first receiving device, a second set of subcarriers with pilot signaling for a second receiving device, and a third set of subcarriers with PAPR signaling. In some aspects, the pilot symbol may include additional sets of pilot signaling for additional receiving devices and/or additional streams and/or ports associated with a same receiving device.

Based at least in part on providing PAPR signaling on the pilot symbol, the pilot symbol may have reduced PAPR. Additionally, or alternatively, the pilot symbol may support FDM of multiple pilot signals with reduced degradation of performance from PAPR of FDM.

In some aspects, tone reservation subcarriers may be occupied with PAPR reduction signals, which are not DMRS signals. Tone reservation algorithms may not be sensitive to which subcarrier locations are assigned for the PAPR reduction. Additionally, or alternatively, tone reservation assigned subcarriers may have relatively low energy compared to DMRS resources (e.g., resource elements). DMRS pilots are not needed for every resource element (RE) based at least in part on channel estimation supporting interpolation using a distance of 2-6 REs depending on delay spread of a channel. In this way, tone reservation REs may be transmitted periodically inside a DFT-S-OFDM symbol that carries the DMRS signals.

In some aspects, the network may configure a "dummy" DMRS port on top of transmitted DMRS ports, with the dummy DMRS port having the PAPR signaling configured to keep the PAPR low. Some networks may have a limited combination of numbers of required DMRS ports, which may support pre-computation and specification of the tone reservation signal in a communication protocol.

Figure 5:
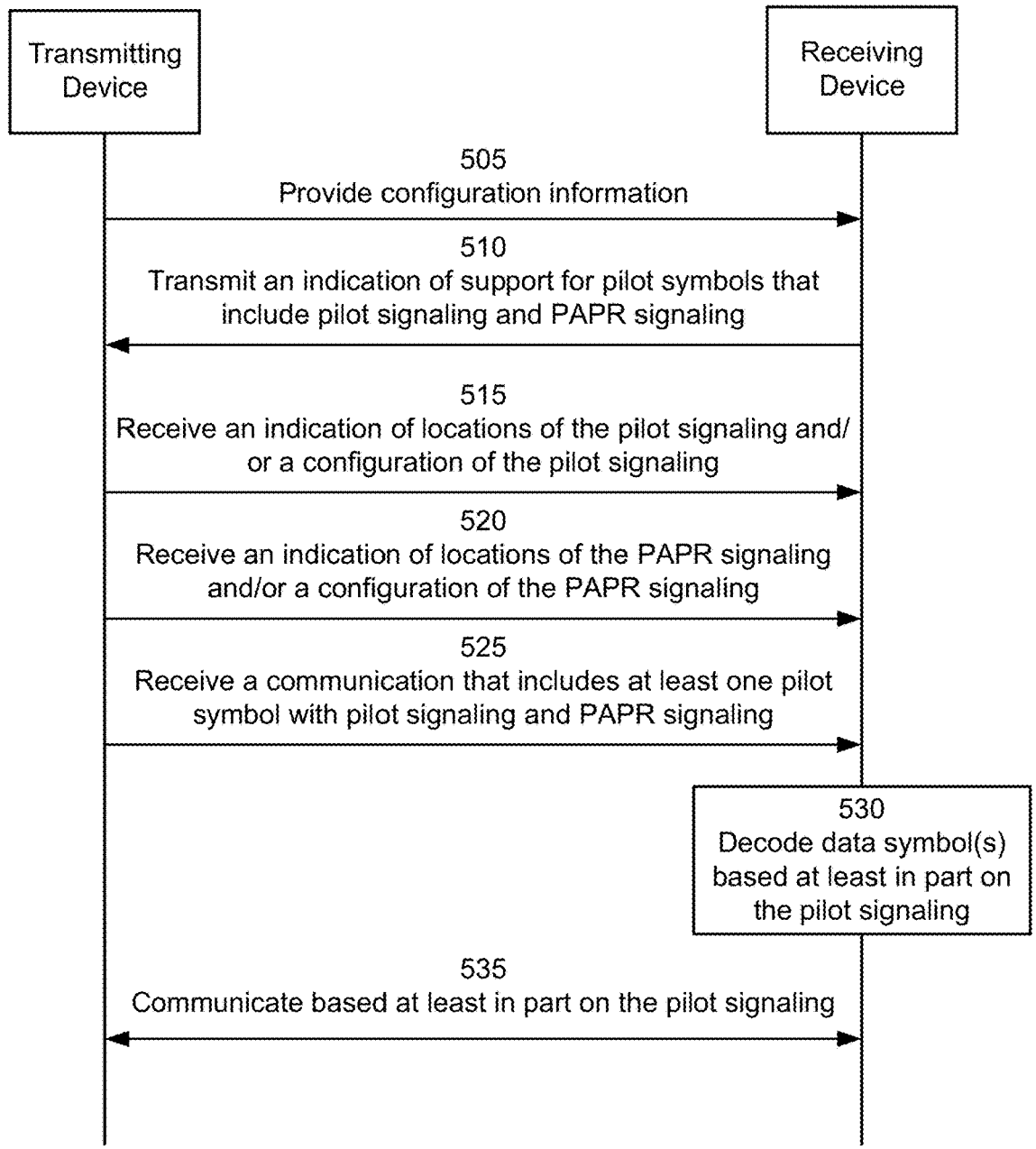
FIG. 5 is a diagram of an example associated with pilot symbols having pilot signaling and PAPR signaling, in accordance with the present disclosure.

FIG. 5 is a diagram of an example 500 associated with pilot symbols having pilot signaling and PAPR signaling, in accordance with the present disclosure. As shown in FIG. 5, a transmitting device (e.g., network node 110, a CU, a DU, and/or an RU) may communicate with a receiving device (e.g., UE 120). In some aspects, the transmitting device and the receiving device may be part of a wireless network (e.g., wireless network 100). The transmitting device and the receiving device may have established a wireless connection prior to operations shown in FIG. 5. In some aspects, the transmitting device and the receiving device may communicate via MIMO communications.

As shown by reference number 505, the transmitting device and the receiving device may exchange configuration information. For example, as shown by reference number 505, the transmitting device may transmit the configuration information to the receiving device. In other examples, the receiving device may transmit the configuration information to the transmitting device (e.g., if the receiving device is a network node and/or the transmitting device is a UE, among other examples). In some aspects, the receiving device may receive the configuration information via one or more of RRC signaling, one or more medium access control (MAC) control elements (CEs), and/or downlink control information (DCI), among other examples. In some aspects, the configuration information may include an indication of one or more configuration parameters (e.g., already known to the receiving device and/or previously indicated by the transmitting device or other network device) for selection by the receiving device, and/or explicit configuration information for the receiving device to use to configure the receiving device, among other examples.

In some aspects, the configuration information may indicate that the receiving device is to provide a capabilities report and/or an indication of support for communicating via an FDM waveform, via a DFT-s-OFDM waveform, and/or using a pilot symbol that includes pilot signaling and PAPR signaling, among other examples. In some aspects, the configuration information may indicate a format for signaling use of the pilot symbol that includes pilot signaling and PAPR signaling. In some aspects, the configuration information may indicate one or more parameters for using the pilot symbol that includes pilot signaling and PAPR signaling.

The receiving device may configure itself based at least in part on the configuration information. In some aspects, the receiving device may be configured to perform one or more operations described herein based at least in part on the configuration information.

As shown by reference number 510, the receiving device may transmit, and the transmitting device may receive, an indication of support for pilot symbols that include pilot signaling and PAPR signaling. For example, the indication of support may indicate a number of subcarriers that the receiving device supports for pilot signaling within the pilot symbol. For example, the receiving device may indicate that a minimum number of subcarriers, or a minimum ratio of subcarriers, is needed to carry the pilot signaling within the pilot symbol. Additionally, or alternatively, the receiving device may indicate a number of ports (e.g., used for pilots with different streams and/or PAPR signaling) that the pilot symbol may include and still be used as a pilot for the receiving device.

As shown by reference number 515, the receiving device may receive, and the transmitting device may transmit, an indication of locations (e.g., frequency locations of associated subcarriers) of the pilot signaling and/or a configuration of the pilot signaling. For example, the receiving device may receive an indication of locations of a first set of one or more subcarriers that are to carry the pilot signaling (e.g., DMRSs signaling). The configuration of the pilot signaling may indicate a sequence used in the pilot signaling and/or power parameters of the pilot signaling, among other examples.

As shown by reference number 520, the receiving device may receive, and the transmitting device may transmit, an indication of locations (e.g., frequency locations of associated subcarriers) of the PAPR signaling and/or a configuration of the PAPR signaling. For example, the receiving device may receive an indication of locations of a second set of one or more subcarriers that are to carry the PAPR signaling. The configuration of the pilot signaling may indicate a waveform and/or power parameters of the PAPR signaling (e.g., signaling configured to reduce a PAPR of the communication and/or having no data or control information or pilot sequences), among other examples.

As shown by reference number 525, the receiving device may receive, and the transmitting device may transmit, a communication that includes at least one pilot symbol with pilot signaling and PAPR signaling. In some aspects, the at least one pilot symbol may include pilot signaling on a first set of one or more subcarriers and PAPR signaling on a second set of one or more subcarriers. In some aspects, the at least one pilot symbol may include additional pilot signaling (e.g., associated with an additional receiving device and/or an additional stream for the receiving device) on a third set of one or more subcarriers, etc.

In some aspects, the PAPR signaling may include signaling transmitted with different power levels at different subcarrier locations of a communication. The signaling may be configured with the different power levels at the different subcarriers such that, when the signaling is added to another part of a communication (e.g., the data and/or the pilots), a power of the communication across all subcarriers of the communication may have a reduced variation (e.g., variations between peak power levels and an average power level). In this way, the communication may have a reduced PAPR based at least in part on inserting the PAPR signaling into the communication at the second set of the one or more subcarriers. The reduced PAPR may reduce saturation of a power amplifier at a transmitting device, which may improve power efficiency and/or reduce signal clipping. Additionally, or alternatively, the reduced PAPR reduce saturation at a receiver, which may improve demodulation of the communication.

In some aspects, the communication may include an FDM communication and/or a DFT-s-OFDM communication, among other examples. For example, the communication may include single waveform data symbols and the pilot symbols. In some aspects, the pilot symbol may include the pilot signaling interleaved with the PAPR signaling. In some aspects in which multiple pilot signalings are used (e.g., associated with different ports), the pilot symbol may include subcarriers sequentially rotated (e.g., in a frequency domain) through pilot signaling for each port and the PAPR signaling. For example, the pilot symbol may have a pattern of subcarriers, described in sequence from a highest frequency to a lowest frequency subcarrier as: port 0 pilot signaling on subcarrier n, port 1 pilot signaling on subcarrier n-1, port 2 pilot signaling on subcarrier n-2, PAPR signaling on subcarrier n-3, port 0 pilot signaling on subcarrier n-4, port 1 pilot signaling on subcarrier n-5, port 2 pilot signaling on subcarrier n-6, PAPR signaling on subcarrier 7, etc.

As shown by reference number 530, the receiving device may decode one or more data symbols based at least in part on the pilot signaling. In some aspects, the receiving device may use the pilot signaling (e.g., DMRSs) to perform channel estimation. In some aspects, the receiving device may interpolate between subcarriers of the pilot symbol that carry the pilot signaling to estimate a channel associated with the communication. The receiving device may use the channel estimation to attempt to decode data symbols of the communication.

As shown by reference number 535, the transmitting device and the receiving device may communicate based at least in part on the pilot signaling. In some aspects, the transmitting device and the receiving device may communicate using an FDM communication and/or a DFT-s-OFDM communication, among other examples. For example, the transmitting device and the receiving device may use communications that include single waveform data symbols and the pilot symbols.

Based at least in part on providing PAPR signaling on the pilot symbol, the pilot symbol may have reduced PAPR. Additionally, or alternatively, the pilot symbol may support FDM of multiple pilot signals with reduced degradation of performance from PAPR of FDM. In this way, the transmitting device and the receiving device may conserve network resources that may have otherwise been used to communicate additional pilot symbols for individual streams and/or receiving devices.

As indicated above, FIG. 5 is provided as an example. Other examples may differ from what is described with respect to FIG. 5.

Figure 6:
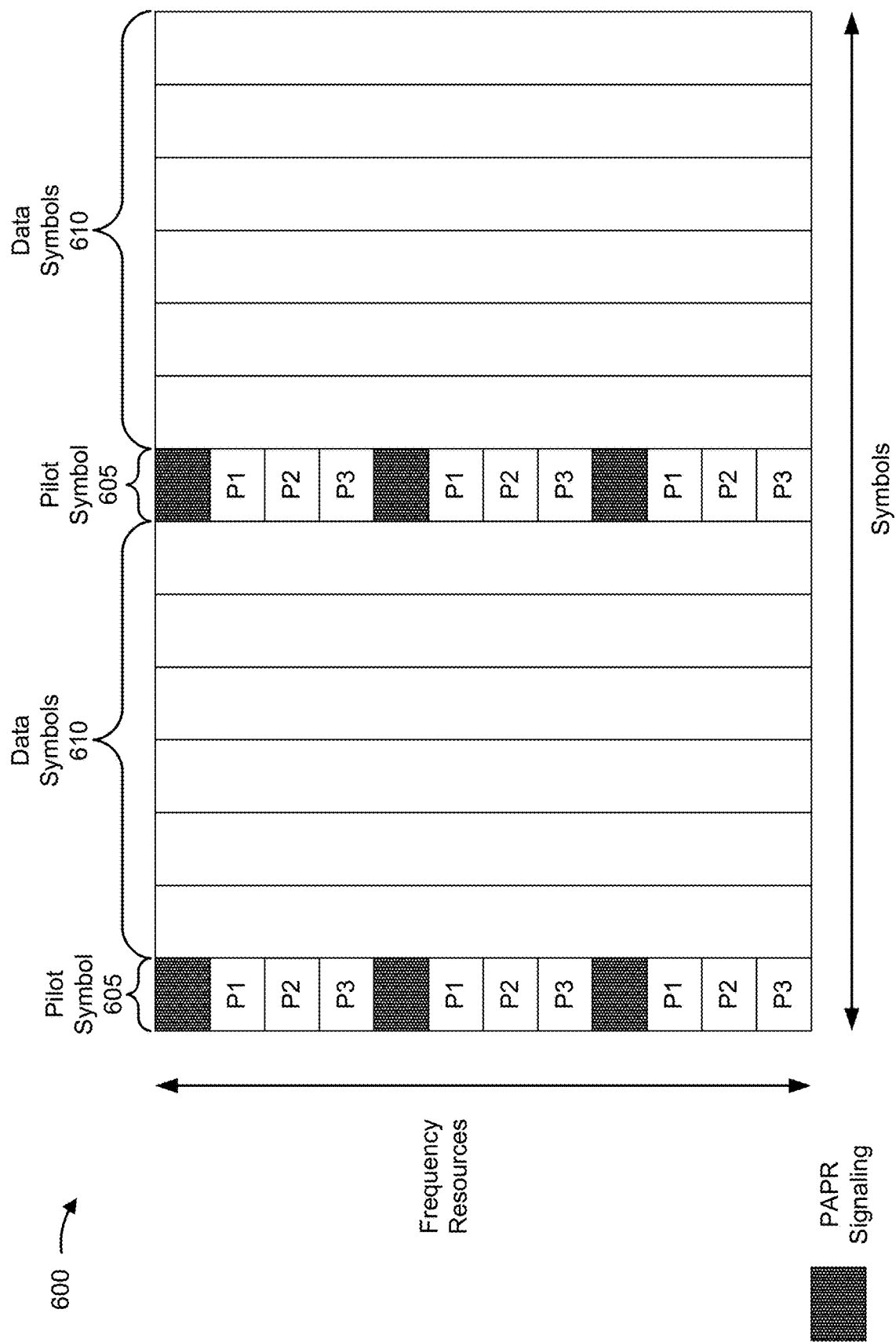
FIG. 6 is a diagram of an example associated with pilot symbols having pilot signaling and PAPR signaling, in accordance with the present disclosure.

FIG. 6 is a diagram of an example 600 associated with pilot symbols having pilot signaling and PAPR signaling, in accordance with the present disclosure. In FIG. 6, a transmitting device (e.g., network node 110, a CU, a DU, and/or an RU) may communicate with a receiving device (e.g., UE 120) using communications that include a pilot symbol having one or more pilot signaling ports and a PAPR signaling port. In some aspects, the transmitting device and the receiving device may be part of a wireless network (e.g., wireless network 100). The transmitting device and the receiving device may have established a wireless connection prior to operations shown in FIG. 6.

As shown in FIG. 6, the communication may include one or more pilot symbols 605 and one or more sets of data symbols 610. The communication may include a number of pilot symbols that is based at least in part on channel conditions (e.g., associated with changing channel conditions that may require additional pilot density within the communication). As shown, the communication may include two pilot symbols 605, and this is a non-limiting example. The communication may include a single pilot symbol 605, three pilot symbols, or more pilot symbols.

The pilot symbols 605 include a first pilot symbol port (P1), a second pilot symbol port (P2), a third pilot symbol port (P3), and PAPR signaling. In some aspects, the communication may include pilot signaling in each of the pilot signal ports or in only a portion of the pilot signal ports. For example, the communication may be configured with a number of pilot signal ports whether or not each of the pilot signal ports is in use. As shown in FIG. 6, the pilot symbol may interleave resources for the pilot signal ports and the PAPR signaling.

In some aspects, a first pilot symbol 605 and a second pilot symbol 605 may include a same set of pilot signal ports and PAPR signaling. In some aspects, the first pilot symbol 605 may include a first set of pilot signal ports, and the second pilot symbol 605 may include a second set of pilot signal ports. In some aspects, the PAPR signaling occupies a pilot signal port as a dummy port. In this way, the PAPR signaling may be included on each pilot symbol 605 or may be included on a subset of pilot symbols 605.

The receiving device may use one or more ports of pilot signaling to estimate a channel of the communication. The receiving device may use the channel estimate to decode the data symbols 610 using interpolation and/or extrapolation.

As indicated above, FIG. 6 is provided as an example. Other examples may differ from what is described with respect to FIG. 6.

FIG. 7 is a diagram illustrating an example process 700 performed, for example, by a receiving device, in accordance with the present disclosure. Example process 700 is an example where the receiving device (e.g., UE 120]) performs operations associated with pilot symbols having pilot signaling and PAPR signaling.

As shown in FIG. 7, in some aspects, process 700 may include receiving a communication that includes at least one pilot symbol, the at least one pilot symbol including pilot signaling on a first set of one or more subcarriers and PAPR signaling on a second set of one or more subcarriers (block 710). For example, the receiving device (e.g., using communication manager 140 and/or reception component 902, depicted in FIG. 9) may receive a communication that includes at least one pilot symbol, the at least one pilot symbol including pilot signaling on a first set of one or more subcarriers and PAPR signaling on a second set of one or more subcarriers, as described above.

As further shown in FIG. 7, in some aspects, process 700 may include communicating based at least in part on the pilot signaling (block 720). For example, the receiving device (e.g., using communication manager 140, reception component 902, and/or transmission component 904, depicted in FIG. 9) may communicate based at least in part on the pilot signaling, as described above.

Process 700 may include additional aspects, such as any single aspect or any combination of aspects described below and/or in connection with one or more other processes described elsewhere herein.

In a first aspect, process 700 includes decoding one or more data symbols of the communication based at least in part on the pilot signaling.

In a second aspect, alone or in combination with the first aspect, communicating based at least in part on the pilot signaling comprises communicating using a DFT-s-OFDM communication.

In a third aspect, alone or in combination with one or more of the first and second aspects, process 700 includes transmitting an indication of support for the at least one pilot symbol including pilot signaling on the first set of one or more subcarriers and the PAPR signaling on the second set of one or more subcarriers.

In a fourth aspect, alone or in combination with one or more of the first through third aspects, process 700 includes receiving an indication of locations of the first set of one or more subcarriers and a configuration of the pilot signaling.

In a fifth aspect, alone or in combination with one or more of the first through fourth aspects, process 700 includes receiving an indication of locations of the second set of one or more subcarriers and a configuration of the PAPR signaling.

In a sixth aspect, alone or in combination with one or more of the first through fifth aspects, the pilot signaling comprises DMRS signaling.

In a seventh aspect, alone or in combination with one or more of the first through sixth aspects, a pilot symbol of the at least one pilot symbol comprises the pilot signaling, associated with the receiving device, on the first set of one or more subcarriers, the PAPR signaling on the second set of one or more subcarriers, and additional pilot signaling, associated with an additional receiving device, on a third set of one or more subcarriers.

In an eighth aspect, alone or in combination with one or more of the first through seventh aspects, the pilot signaling, the PAPR signaling, and the additional pilot signaling are interleaved in a frequency domain of the pilot symbol.

In a ninth aspect, alone or in combination with one or more of the first through eighth aspects, the receiving device comprises a UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a transmitting device, in accordance with the present disclosure. Example process 800 is an example where the transmitting device (e.g., a network node 110) performs operations associated with pilot symbols having pilot signaling and PAPR signaling.

As shown in FIG. 8, in some aspects, process 800 may include transmitting a communication that includes at least one pilot symbol, the at least one pilot symbol including pilot signaling on a first set of one or more subcarriers and PAPR signaling on a second set of one or more subcarriers (block 810). For example, the transmitting device (e.g., using communication manager 150 and/or transmission component 1004, depicted in FIG. 10) may transmit a communication that includes at least one pilot symbol, the at least one pilot symbol including pilot signaling on a first set of one or more subcarriers and PAPR signaling on a second set of one or more subcarriers, as described above.

As further shown in FIG. 8, in some aspects, process 800 may include communicating based at least in part on the pilot signaling (block 820). For example, the transmitting device (e.g., using communication manager 150, transmission component 1004, and/or reception component 1002, depicted in FIG. 10) may communicate based at least in part on the pilot signaling, as described above.

Process 800 may include additional aspects, such as any single aspect or any combination of aspects described below and/or in connection with one or more other processes described elsewhere herein.

In a first aspect, communicating based at least in part on the pilot signaling comprises communicating using a DFT-s-OFDM communication.

In a second aspect, alone or in combination with the first aspect, process 800 includes receiving, from one or more receiving devices, an indication of support for the at least one pilot symbol including pilot signaling on the first set of one or more subcarriers and the PAPR signaling on the second set of one or more subcarriers.

In a third aspect, alone or in combination with one or more of the first and second aspects, process 800 includes transmitting an indication of locations of the first set of one or more subcarriers and a configuration of the pilot signaling.

In a fourth aspect, alone or in combination with one or more of the first through third aspects, process 800 includes transmitting an indication of locations of the second set of one or more subcarriers and a configuration of the PAPR signaling.

In a fifth aspect, alone or in combination with one or more of the first through fourth aspects, the pilot signaling comprises DMRS signaling.

In a sixth aspect, alone or in combination with one or more of the first through fifth aspects, a pilot symbol of the at least one pilot symbol comprises the pilot signaling, associated with a first receiving device, on the first set of one or more subcarriers, the PAPR signaling on the second set of one or more subcarriers, and additional pilot signaling, associated with a second receiving device, on a third set of one or more subcarriers.

In a seventh aspect, alone or in combination with one or more of the first through sixth aspects, the pilot signaling, the PAPR signaling, and the additional pilot signaling are interleaved in a frequency domain of the pilot symbol.

In an eighth aspect, alone or in combination with one or more of the first through seventh aspects, the transmitting device comprises a network node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
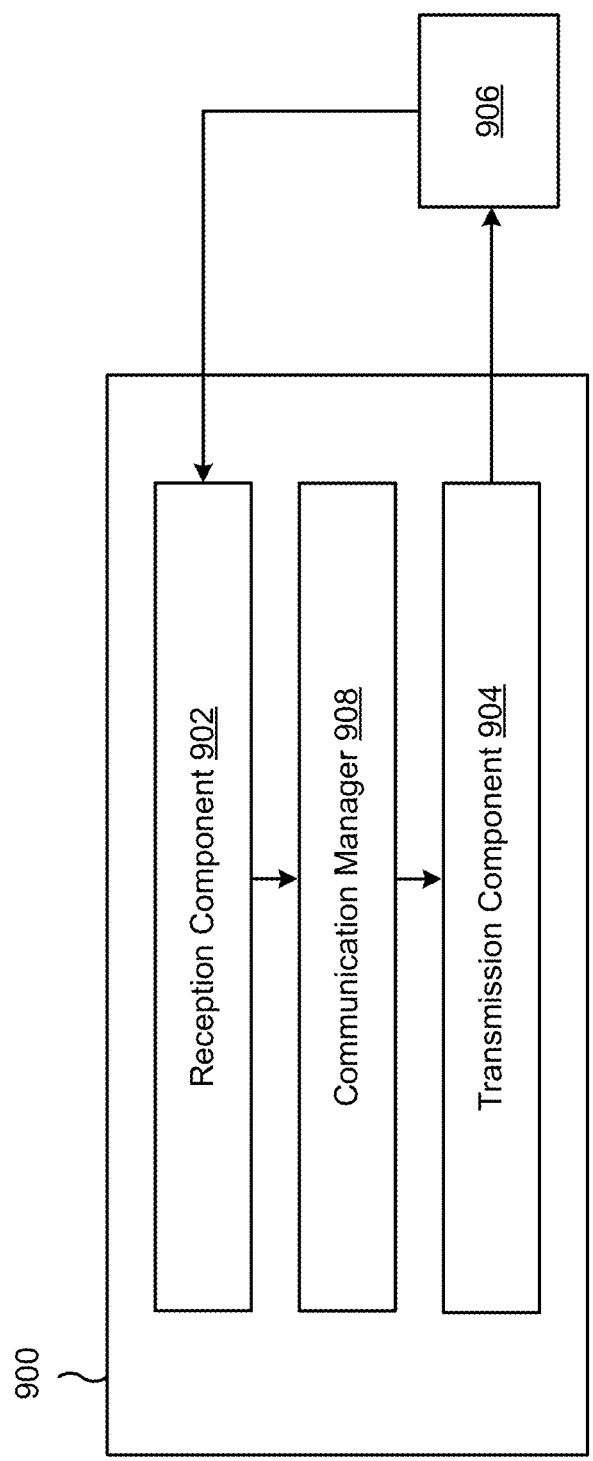
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a receiving device, or a receiving device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 140).

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the receiving device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the receiving device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the receiving device described in connection with FIG. 2. In some aspects, the transmission component 904 may be co-located with the reception component 902 in a transceiver.

The reception component 902 may receive a communication that includes at least one pilot symbol, the at least one pilot symbol including pilot signaling on a first set of one or more subcarriers and PAPR signaling on a second set of one or more subcarriers. The reception component 902, the transmission component 904, and/or the communication manager 908 may communicate based at least in part on the pilot signaling.

The reception component 902 and/or the communication manager 908 may decode one or more data symbols of the communication based at least in part on the pilot signaling.

The transmission component 904 may transmit an indication of support for the at least one pilot symbol including pilot signaling on the first set of one or more subcarriers and the PAPR signaling on the second set of one or more subcarriers.

The reception component 902 may receive an indication of locations of the first set of one or more subcarriers and a configuration of the pilot signaling.

The reception component 902 may receive an indication of locations of the second set of one or more subcarriers and a configuration of the PAPR signaling.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
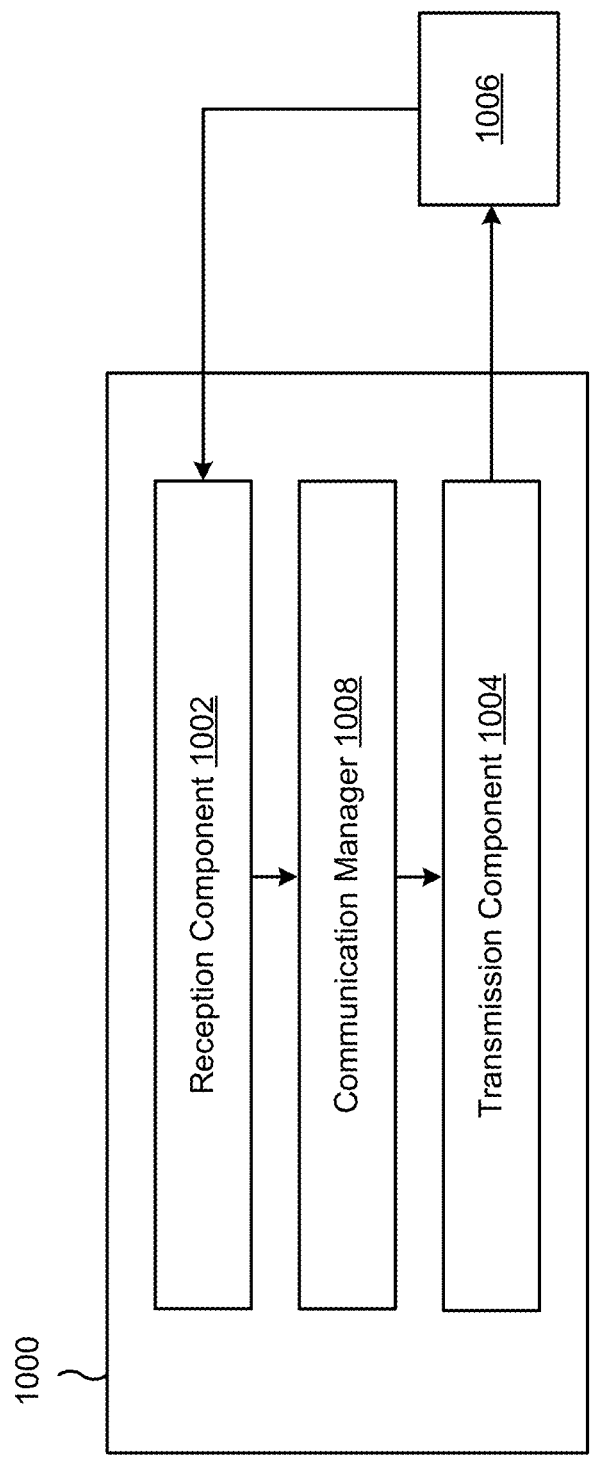
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a transmitting device, or a transmitting device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150).

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the transmitting device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the transmitting device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the transmitting device described in connection with FIG. 2. In some aspects, the transmission component 1004 may be co-located with the reception component 1002 in a transceiver.

The reception component 1002 may receive a communication that includes at least one pilot symbol, the at least one pilot symbol including pilot signaling on a first set of one or more subcarriers and PAPR signaling on a second set of one or more subcarriers. The reception component 1002, the transmission component 1004, and/or the communication manager 1008 may communicate based at least in part on the pilot signaling.

The reception component 1002 and/or the communication manager 1008 may decode one or more data symbols of the communication based at least in part on the pilot signaling.

The transmission component 1004 may transmit an indication of support for the at least one pilot symbol including pilot signaling on the first set of one or more subcarriers and the PAPR signaling on the second set of one or more subcarriers.

The reception component 1002 may receive an indication of locations of the first set of one or more subcarriers and a configuration of the pilot signaling.

The reception component 1002 may receive an indication of locations of the second set of one or more subcarriers and a configuration of the PAPR signaling.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a receiving device, comprising: receiving a communication that includes at least one pilot symbol, the at least one pilot symbol including pilot signaling on a first set of one or more subcarriers and peak-to-average-power-ratio (PAPR) signaling on a second set of one or more subcarriers; and communicating based at least in part on the pilot signaling.

Aspect 2: The method of Aspect 1, further comprising: decoding one or more data symbols of the communication based at least in part on the pilot signaling.

Aspect 3: The method of any of Aspects 1-2, wherein communicating based at least in part on the pilot signaling comprises: communicating using a discrete Fourier transform-spread orthogonal frequency-division multiplexing (DFT-s-OFDM) communication.

Aspect 4: The method of any of Aspects 1-3, further comprising: transmitting an indication of support for the at least one pilot symbol including pilot signaling on the first set of one or more subcarriers and the PAPR signaling on the second set of one or more subcarriers.

Aspect 5: The method of any of Aspects 1-4, further comprising: receiving an indication of locations of the first set of one or more subcarriers and a configuration of the pilot signaling.

Aspect 6: The method of any of Aspects 1-5, further comprising: receiving an indication of locations of the second set of one or more subcarriers and a configuration of the PAPR signaling.

Aspect 7: The method of any of Aspects 1-6, wherein the pilot signaling comprises demodulation reference signal (DMRS) signaling.

Aspect 8: The method of any of Aspects 1-7, wherein a pilot symbol of the at least one pilot symbol comprises: the pilot signaling, associated with the receiving device, on the first set of one or more subcarriers, the PAPR signaling on the second set of one or more subcarriers, and additional pilot signaling, associated with an additional receiving device, on a third set of one or more subcarriers.

Aspect 9: The method of Aspect 8, wherein the pilot signaling, the PAPR signaling, and the additional pilot signaling are interleaved in a frequency domain of the pilot symbol.

Aspect 10: The method of any of Aspects 1-9, wherein the receiving device comprises a user equipment (UE).

Aspect 11: A method of wireless communication performed by a transmitting device, comprising: transmitting a communication that includes at least one pilot symbol, the at least one pilot symbol including pilot signaling on a first set of one or more subcarriers and peak-to-average-power-ratio (PAPR) signaling on a second set of one or more subcarriers; and communicating based at least in part on the pilot signaling.

Aspect 12: The method of Aspect 11, wherein communicating based at least in part on the pilot signaling comprises: communicating using a discrete Fourier transform-spread orthogonal frequency-division multiplexing (DFT-s-OFDM) communication.

Aspect 13: The method of any of Aspects 11-12, further comprising: receiving, from one or more receiving devices, an indication of support for the at least one pilot symbol including pilot signaling on the first set of one or more subcarriers and the PAPR signaling on the second set of one or more subcarriers.

Aspect 14: The method of any of Aspects 11-13, further comprising: transmitting an indication of locations of the first set of one or more subcarriers and a configuration of the pilot signaling.

Aspect 15: The method of any of Aspects 11-14, further comprising: transmitting an indication of locations of the second set of one or more subcarriers and a configuration of the PAPR signaling.

Aspect 16: The method of any of Aspects 11-15, wherein the pilot signaling comprises demodulation reference signal (DMRS) signaling.

Aspect 17: The method of any of Aspects 11-16, wherein a pilot symbol of the at least one pilot symbol comprises: the pilot signaling, associated with a first receiving device, on the first set of one or more subcarriers, the PAPR signaling on the second set of one or more subcarriers, and additional pilot signaling, associated with a second receiving device, on a third set of one or more subcarriers.

Aspect 18: The method of Aspect 17, wherein the pilot signaling, the PAPR signaling, and the additional pilot signaling are interleaved in a frequency domain of the pilot symbol.

Aspect 19: The method of any of Aspects 11-18, wherein the transmitting device comprises a network node.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiving device for wireless communication, comprising:
  one or more memories; and
  one or more processors, coupled to the one or more memories, configured to:
    receive a communication that includes at least one pilot symbol, the at least one pilot symbol including pilot signaling on a first set of one or more subcarriers and peak-to-average-power-ratio (PAPR) signaling on a second set of one or more subcarriers, wherein the PAPR signaling comprises tone reservation signaling, and wherein the first set of one or more subcarriers and the second set of one or more subcarriers are sequentially rotated through the pilot signaling and the PAPR signaling; and communicate based at least in part on the pilot signaling.

2. The receiving device of claim 1, wherein the one or more processors are further configured to:
decode one or more data symbols of the communication based at least in part on the pilot signaling.

3. The receiving device of claim 1, wherein the one or more processors, to communicate based at least in part on the pilot signaling, are configured to:
communicate using a discrete Fourier transform-spread orthogonal frequency-division multiplexing (DFT-s-OFDM) communication.

4. The receiving device of claim 1, wherein the one or more processors are further configured to:
transmit an indication of support for the at least one pilot symbol including pilot signaling on the first set of one or more subcarriers and the PAPR signaling on the second set of one or more subcarriers.

5. The receiving device of claim 1, wherein the one or more processors are further configured to:
receive an indication of locations of the first set of one or more subcarriers and a configuration of the pilot signaling.

6. The receiving device of claim 1, wherein the one or more processors are further configured to:
receive an indication of locations of the second set of one or more subcarriers and a configuration of the PAPR signaling.

7. The receiving device of claim 1, wherein the pilot signaling comprises demodulation reference signal (DMRS) signaling.

8. The receiving device of claim 1, wherein a pilot symbol of the at least one pilot symbol comprises:
the pilot signaling, associated with the receiving device, on the first set of one or more subcarriers,
the PAPR signaling on the second set of one or more subcarriers, and
additional pilot signaling, associated with an additional receiving device, on a third set of one or more subcarriers.

9. The receiving device of claim 8, wherein the pilot signaling, the PAPR signaling, and the additional pilot signaling are interleaved in a frequency domain of the pilot symbol.

10. The receiving device of claim 1, wherein the receiving device comprises a user equipment (UE).

11. A transmitting device for wireless communication, comprising:
one or more memories; and
one or more processors, coupled to the one or more memories, configured to:
transmit a communication that includes at least one pilot symbol, the at least one pilot symbol including pilot signaling on a first set of one or more subcarriers and peak-to-average-power-ratio (PAPR) signaling on a second set of one or more subcarriers, wherein the PAPR signaling comprises tone reservation signaling, and wherein the first set of one or more subcarriers and the second set of one or more subcarriers are sequentially rotated through the pilot signaling and the PAPR signaling; and communicate based at least in part on the pilot signaling.

12. The transmitting device of claim 11, wherein the one or more processors, to communicate based at least in part on the pilot signaling, are configured to:
communicate using a discrete Fourier transform-spread orthogonal frequency-division multiplexing (DFT-s-OFDM) communication.

13. The transmitting device of claim 11, wherein the one or more processors are further configured to:
receive, from one or more receiving devices, an indication of support for the at least one pilot symbol including pilot signaling on the first set of one or more subcarriers and the PAPR signaling on the second set of one or more subcarriers.

14. The transmitting device of claim 11, wherein the one or more processors are further configured to:
transmit an indication of locations of the first set of one or more subcarriers and a configuration of the pilot signaling.

15. The transmitting device of claim 11, wherein the one or more processors are further configured to:
transmit an indication of locations of the second set of one or more subcarriers and a configuration of the PAPR signaling.

16. The transmitting device of claim 11, wherein the pilot signaling comprises demodulation reference signal (DMRS) signaling.

17. The transmitting device of claim 11, wherein a pilot symbol of the at least one pilot symbol comprises:
the pilot signaling, associated with a first receiving device, on the first set of one or more subcarriers,
the PAPR signaling on the second set of one or more subcarriers, and
additional pilot signaling, associated with a second receiving device, on a third set of one or more subcarriers.

18. The transmitting device of claim 17, wherein the pilot signaling, the PAPR signaling, and the additional pilot signaling are interleaved in a frequency domain of the pilot symbol.

19. The transmitting device of claim 11, wherein the transmitting device comprises a network node.

20. A method of wireless communication performed by a receiving device, comprising:
receiving a communication that includes at least one pilot symbol, the at least one pilot symbol including pilot signaling on a first set of one or more subcarriers and peak-to-average-power-ratio (PAPR) signaling on a second set of one or more subcarriers, wherein the PAPR signaling comprises tone reservation signaling, and wherein the first set of one or more subcarriers and the second set of one or more subcarriers are sequentially rotated through the pilot signaling and the PAPR signaling; and
communicating based at least in part on the pilot signaling.

21. The method of claim 20, wherein communicating based at least in part on the pilot signaling comprises:
communicating using a discrete Fourier transform-spread orthogonal frequency-division multiplexing (DFT-s-OFDM) communication.

22. The method of claim 20, further comprising:
transmitting an indication of support for the at least one pilot symbol including pilot signaling on the first set of one or more subcarriers and the PAPR signaling on the second set of one or more subcarriers.

23. The method of claim 20, further comprising:
receiving an indication of locations of the first set of one or more subcarriers and a configuration of the pilot signaling.

24. The method of claim 20, further comprising:
receiving an indication of locations of the second set of one or more subcarriers and a configuration of the PAPR signaling.

25. The method of claim 20, wherein a pilot symbol of the at least one pilot symbol comprises:
the pilot signaling, associated with the receiving device, on the first set of one or more subcarriers,
the PAPR signaling on the second set of one or more subcarriers, and
additional pilot signaling, associated with an additional receiving device, on a third set of one or more subcarriers.

26. A method of wireless communication performed by a transmitting device, comprising:
transmitting a communication that includes at least one pilot symbol, the at least one pilot symbol including pilot signaling on a first set of one or more subcarriers and peak-to-average-power-ratio (PAPR) signaling on a second set of one or more subcarriers, wherein the PAPR signaling comprises tone reservation signaling, and wherein the first set of one or more subcarriers and the second set of one or more subcarriers are sequentially rotated through the pilot signaling and the PAPR signaling; and
communicating based at least in part on the pilot signaling.

27. The method of claim 26, wherein communicating based at least in part on the pilot signaling comprises:
communicating using a discrete Fourier transform-spread orthogonal frequency-division multiplexing (DFT-s-OFDM) communication.

28. The method of claim 26, further comprising:
transmitting an indication of locations of the first set of one or more subcarriers and a configuration of the pilot signaling.

29. The method of claim 26, further comprising:
transmitting an indication of locations of the second set of one or more subcarriers and a configuration of the PAPR signaling.

30. The method of claim 26, wherein a pilot symbol of the at least one pilot symbol comprises:
the pilot signaling, associated with a first receiving device, on the first set of one or more subcarriers,
the PAPR signaling on the second set of one or more subcarriers, and
additional pilot signaling, associated with a second receiving device, on a third set of one or more subcarriers.

* * * * *